US012791657B2

(12) United States Patent
Carswell

(10) Patent No.: US 12,791,657 B2
(45) Date of Patent: Nov. 10, 2026

(54) CONICAL SCAN WEATHER RADAR

(71) Applicant: The Tomorrow Companies Inc., Boston, MA (US)

(72) Inventor: James R. Carswell, Boston, MA (US)

(73) Assignee: The Tomorrow Companies Inc., Boston, MA (US)

( * ) Notice: Subject to any disclaimer, the term of this patent is extended or adjusted under 35 U.S.C. 154(b) by 135 days.

(21) Appl. No.: 18/916,044

(22) Filed: Oct. 15, 2024

(65) Prior Publication Data

US 2026/0110771 A1 Apr. 23, 2026

Related U.S. Application Data

(63) Continuation of application No. 17/219,659, filed on Mar. 31, 2021, now Pat. No. 12,146,979, which is a
(Continued)

(51) Int. Cl.
*G01S 7/295* (2006.01)
*G01S 7/02* (2006.01)
(Continued)

(52) U.S. Cl.
CPC ................ *G01S 7/295* (2013.01); *G01S 7/02* (2013.01); *G01S 7/282* (2013.01); *G01S 7/288* (2013.01);
(Continued)

(58) Field of Classification Search
CPC .. G01S 13/225; G01S 13/422; G01S 13/9088; G01S 2013/0245; G01S 7/02;
(Continued)

(56) References Cited

U.S. PATENT DOCUMENTS

| | | | |
|---|---|---|---|
| 4,680,779 | A | 7/1987 | Wakerly |
| 5,264,852 | A | 11/1993 | Marquet |

(Continued)

FOREIGN PATENT DOCUMENTS

| | | |
|---|---|---|
| CN | 101672914 B | 1/2012 |
| CN | 103675788 B | 12/2015 |

OTHER PUBLICATIONS

International Search Report and Written Opinion issued in PCT Application No. PCT/US21/25253 dated Jul. 7, 2021 (6 pages).

(Continued)

*Primary Examiner* — Timothy X Pham
(74) *Attorney, Agent, or Firm* — Nixon & Vanderhye P.C.

(57) ABSTRACT

A new measurement approach is disclosed that facilitates significantly smaller size, weight, and power (SWaP) space-borne radar systems that can provide wide swath, high resolution observations. Multiple beams employed in the scan and the complex volume and/or surface backscatter signals of each beam is recorded. Each beam is electronically swept in azimuth where each beam is held at a constant incidence angle over the azimuth sector that covers the swath. Once the sweep is complete, the platform moves forward, by one along track pixel, and the sweep is repeated in order to provide continuous mapping of the volume and surface covered by the swath. Complex volume backscatter is recorded and mapped to each altitude layer to provide full mapping of the atmosphere.

30 Claims, 5 Drawing Sheets

Related U.S. Application Data continuation-in-part of application No. 17/163,640, filed on Feb. 1, 2021, now Pat. No. 11,609,302, which is a continuation of application No. 15/939,562, filed on Mar. 29, 2018, now Pat. No. 10,908,255.

(60) Provisional application No. 63/002,479, filed on Mar. 31, 2020, provisional application No. 62/479,981, filed on Mar. 31, 2017.

(51) Int. Cl.

| | |
|---|---|
| ***G01S 7/282*** | (2006.01) |
| ***G01S 7/285*** | (2006.01) |
| ***G01S 7/288*** | (2006.01) |
| ***G01S 7/35*** | (2006.01) |
| ***G01S 13/02*** | (2006.01) |
| ***G01S 13/22*** | (2006.01) |
| ***G06F 1/12*** | (2006.01) |
| ***G06F 3/00*** | (2006.01) |
| ***G06F 13/42*** | (2006.01) |

(52) U.S. Cl.

CPC .................. *G06F 1/12* (2013.01); *G06F 3/00* (2013.01); *G06F 13/4221* (2013.01); *G01S 7/285* (2013.01); *G01S 7/356* (2021.05); *G01S 2013/0245* (2013.01); *G01S 13/225* (2013.01); *G06F 2213/0026* (2013.01)

(58) Field of Classification Search

CPC .......... G01S 7/282; G01S 7/285; G01S 7/288; G01S 7/295; G01S 7/356; G06F 1/12; G06F 13/4221; G06F 2213/0026; G06F 3/00

See application file for complete search history.

(56) References Cited

U.S. PATENT DOCUMENTS

| | | | | |
|---|---|---|---|---|
| 5,879,301 | A | 3/1999 | Chiabrera et al. | |
| 6,137,437 | A | 10/2000 | Lin et al. | |
| 2005/0083863 | A1 | 4/2005 | Umei et al. | |
| 2008/0001808 | A1 | 1/2008 | Passarelli, Jr. et al. | |
| 2008/0141058 | A1 | 6/2008 | Craddock et al. | |
| 2008/0291077 | A1 | 11/2008 | Chang | |
| 2009/0105985 | A1 | 4/2009 | Steger et al. | |
| 2014/0266899 | A1 * | 9/2014 | Torre ...................... | G01S 13/02 342/371 |
| 2015/0008306 | A1 | 1/2015 | Ellis | |
| 2016/0109570 | A1 | 4/2016 | Calabrese | |
| 2016/0306383 | A1 | 10/2016 | Harriman et al. | |
| 2018/0246202 | A1 | 8/2018 | Kurose | |
| 2019/0179009 | A1 | 6/2019 | Klein et al. | |
| 2020/0091608 | A1 | 3/2020 | Alpman et al. | |

OTHER PUBLICATIONS

Extended European Search Report issued in European Application No. 21779017.9 dated Mar. 11, 2024.

Wang et al., "Novel Scanning Strategy for Future Spaceborne Doppler Weather Radar With Application to Tropical Cyclones", IEEE Journal of Selected Topics in Applied Earth Observations and Remote Sensing, vol. 10, No. 6, pp. 2685-2693, XP011656871, ISSN: 1939-1404, DOI: 10.1109/JSTARS.2017.2672826, Jun. 1, 2017.

* cited by examiner

Having a

CONICAL SCAN WEATHER RADAR

CROSS-REFERENCE TO RELATED APPLICATIONS

This application is a continuation of U.S. application Ser. No. 17/219,659, filed Mar. 31, 2021, now U.S. Pat. No. 12,146,979, which is a continuation-in-part of U.S. application Ser. No. 17/163,640, filed Feb. 1, 2021, now U.S. Pat. No. 11,609,302, which is a continuation of U.S. application Ser. No. 15/939,562 filed Mar. 29, 2018, now U.S. Pat. No. 10,908,255, which claims the benefit of U.S. Provisional Ser. No. 62/479,981 filed Mar. 31, 2017.

This application is also related to and claims priority from earlier filed U.S. Provisional Ser. No. 63/002,479 , filed Mar. 31, 2020.

FIELD

The present disclosure relates to digital signal processing architectures that provide a new measurement approach in radar systems. More specifically, the present disclosure provides a new measurement approach that facilitates significantly smaller size, weight, and power (SWaP) spaceborne radar systems that can provide wide swath, high resolution observations.

SUMMARY

There is a need for improvement in the area of small satellite radar scanning tools. As the ability to process data is constantly increasing, the need for devices that provide faster, higher resolution data to the processing models is also increasing. In the area of weather radar satellites, for example, development is needed to provide lower size, weight, and power consumption devices (SWaP) that operate efficiently yet provide high resolution data for analysis.

In particular, wide swath, high temporal coverage from space and stratospheric platforms are needed to provide global observations of weather, Earth processes, and other events. To achieve this, a constellation of small satellites is required. This requires innovative approaches to reduce the size, weight and power (SWaP) of imaging radar systems capable of observing both the atmosphere and surface. To provide wide swath, high resolution coverage, most conventional radar systems have relied on fan beam geometries (wide elevation beamwidths) and synthetic aperture processing or narrow azimuth beamwidths. FIG. 1 illustrates the current fan-beam approach. Although it provides wide swath coverage, it requires a wide elevation beamwidth. This wide antenna beamwidth prohibits high resolution measurements of the atmosphere and also reduces the antenna gain and thus requires high transmit powers that can be prohibitive on small satellites.

Similarly, cross track scanning is another approach deployed to provide wide swath coverage and high-resolution measurements. FIG. 2 presents this approach, where a narrow beamwidth antenna beam is scanned in incidence angle to sweep across a wide swath. This approach allows for both high resolution measurements of the atmosphere and surface but only provides a single azimuth look direction of each pixel and the incidence angle of each pixel across the swath changes. With a changing incidence angle, the antenna pattern differs from pixel to pixel making calibration more challenging and interpreting the surface return more complex for scenes where the radar cross section changes with incidence angle. This geometry also provides only a single azimuth look of each pixel and the incidence angles are directly tied to the swath width, both facts can further limit ability to retrieve surface parameters such as ocean surface vector winds.

Conical scan radar systems are also known but these systems rely on high-speed mechanical scan reflector antennas where the antenna or the horn is mechanically rotated around the radar boresight or axis. In this manner, the axis of the radar lobe is made to sweep out a cone in space; the apex of this cone is, of course, at the radar transmitter antenna or reflector. At any given distance from the antenna, the path of the lobe axis is a circle. Within the useful range of the beam, the inner edge of the lobe always overlaps the boresight axis. As noted, these systems rely on mechanical apparatus for rotation of the antenna thus increasing the SWAP of these antennas and preventing their use in many smaller satellites.

Digital subsystems for radar, sonar and other general purpose instrumentation implement a variety of functions for these systems such as, generating control and timing signals for the system, monitoring and recording the system's status and health, creating and providing the system's waveforms (e.g. transmit signals, local oscillator signals and reference signals), capturing and processing the system's receive signals and ancillary data, storing the processed data and ancillary data to local and/or remote (e.g. network storage/data servers) storage media, distributing the processed and ancillary data over data and display networks, documenting the state of the system, displaying the processed and ancillary data, and interacting with sensor networks providing real-time data to the network to reconfigure on the fly and react to the sensor network's needs as these needs evolve.

Conventionally, a digital subsystem is implemented using a standard backplane solution (e.g. VPX, PCIe) with a mother board responsible for communication and control, and specialty cards (e.g. DSP, FPGA, digital I/O) implementing specific functions and processing. This results in a bulky subsystem that occupies significant size and weight and consumes considerable power (SWaP), and that cannot be embedded in the instrument itself. These conventional sub-systems require custom firmware and software development, and require significant development, integration and testing. These development activities take significant time and resources and are extremely costly. Custom single board solutions can reduce SWaP but further increase development costs. Additionally, custom solutions offer less flexibility for reconfiguration and limit future expansion. Both approaches result in hardware configurations that are designed for a particular system, and even a specific application for that system. This limits the use of the solutions in other systems, or even for different applications for the system it was originally designed for.

SUMMARY

In this regard, the technology herein provides a new measurement approach that facilitates significantly smaller size, weight, and power (SWaP) spaceborne radar systems that can produce wide swath, high resolution observations. The disclosed system allows observations of multiple parameters, weather and Earth processes from space based and stratospheric platforms. This approach combines a multi-antenna beam conical scan geometry with a multi-mode reconfigurable software defined radar (SDRr) system.

In one embodiment, four beams are illuminated and the complex volume and/or surface backscatter signals of each beam is recorded. Each beam is swept in azimuth where each beam is held at a constant incidence angle over the azimuth sector that covers the swath. Once the sweep is complete, the platform moves forward, by one along track pixel, and the sweep is repeated in order to provide continuous mapping of the volume and surface covered by the swath. Complex volume backscatter is recorded and mapped to each altitude layer to provide full mapping of the atmosphere.

To further reduce the SWaP of the system, the present disclosure employs a unique simultaneous frequency diversity approach in the SDRr. In this arrangement a single SDRr transmit/receive channel is employed to support multiple antenna beams simultaneously. Through a wide bandwidth arbitrary waveform generator (i.e. digital to analog converter, DAC), simultaneous waveforms may be generated that are separated in frequency. This signal channel output is then separated, in this case into four channels either in the IF or RF transmit section of the radar transmitter (depends on final transmit frequency and optimal radar frequency plan). After being separated, each signal can be sent through the final transmit path to the antenna feed for its beam. On reception of the receive signals from each antenna beam, the receive signals can be amplified and combined either in the RF or IF section of the radar system and sent to a signal digital receiver channel (i.e., ADC). Using sub channels and digital bandpass filtering, the return from each antenna beam can be separated and processed. This approach allows for a single ADC and DAC to be used thus reducing the SWaP of the SDRr, and also simplifies the calibration through using common waveform generation and processing hardware for all antenna beams.

In the disclosure of the present technology, wide swath coverage and high spatial resolution are provided through azimuth rotation at constant incidence which in turn allows high sensitivity pencil beam geometry. Further, the use of constant scan incidence simplifies calibration and geophysical retrievals that facilitates constant measurement error across the entire swath.

The use of a fixed beam allows optimization of the sidelobe (SL) pattern to suppress surface return in lower boundary scan layer, while dual beam sampling can eliminate SL contamination. Further this arrangement provides multiple looks (fore and aft) for improved measurement precision and retrievals.

With electronic scanning the beam can also be held in placed and stepped to the next pixel which will improve the spatial resolution. In contrast mechanical scanning will sweep the beam which means it smears it. Electronic scanning also allows for motion (time) to be compensated for so the transmit beam and receive beam are aligned.

For a better understanding of the technology herein, its operating advantages and the specific objects attained by its uses, reference should be had to the accompanying drawings and descriptive matter in which there is illustrated embodiments of the invention.

DETAILED DESCRIPTION OF EXAMPLE EMBODIMENTS

Figure 1:
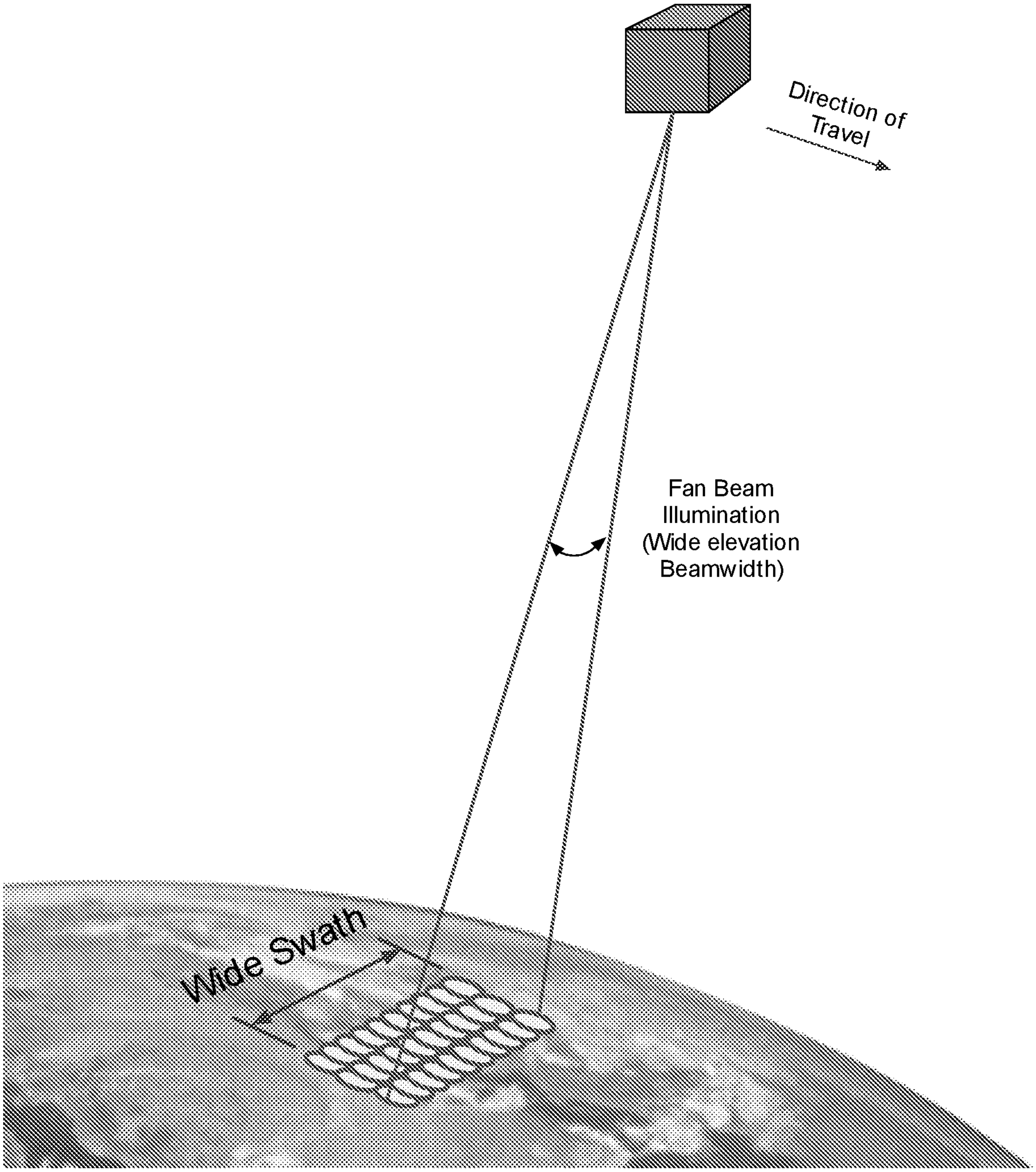
FIGURE 1 (PRIOR ART)
FIG. 1 is a schematic depiction illustrating the prior art wide swath fan-beam scanning approach.
Figure 2:
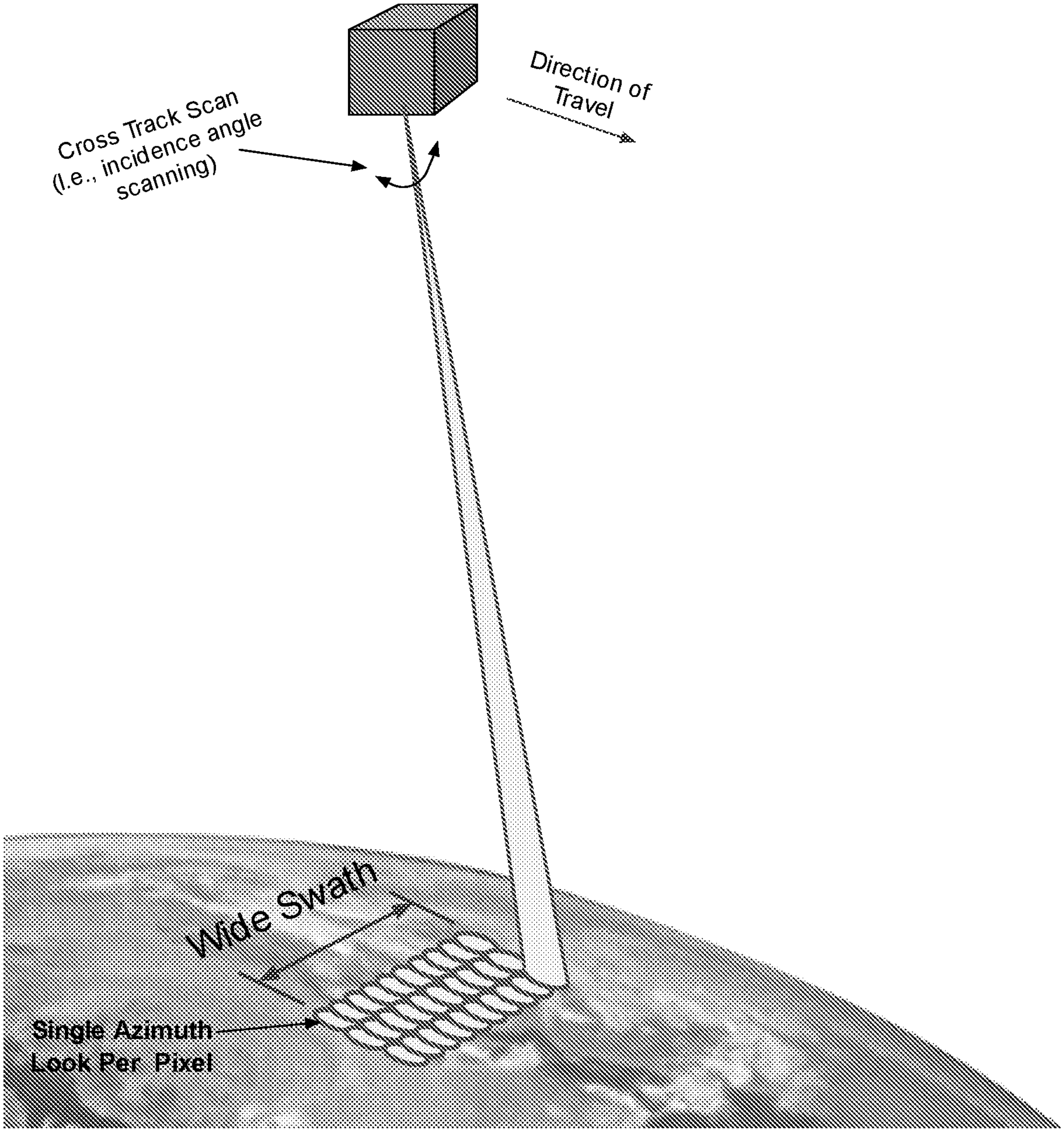
FIGURE 2 (PRIOR ART)
FIG. 2 is diagram depicting another prior art wide swath radar scanning method.

Now referring to the drawings, the new measurement approach that facilitates significantly smaller size, weight, and power (SWaP) spaceborne radar systems that can produce wide swath, high resolution observations is depicted in FIGS. 3-6. The disclosed system allows observations of multiple parameters, weather and Earth processes from space based and stratospheric platforms. This approach combines a multi-antenna beam conical scan geometry with a multi-mode reconfigurable software defined radar (SDRr) system.

Figure 3:
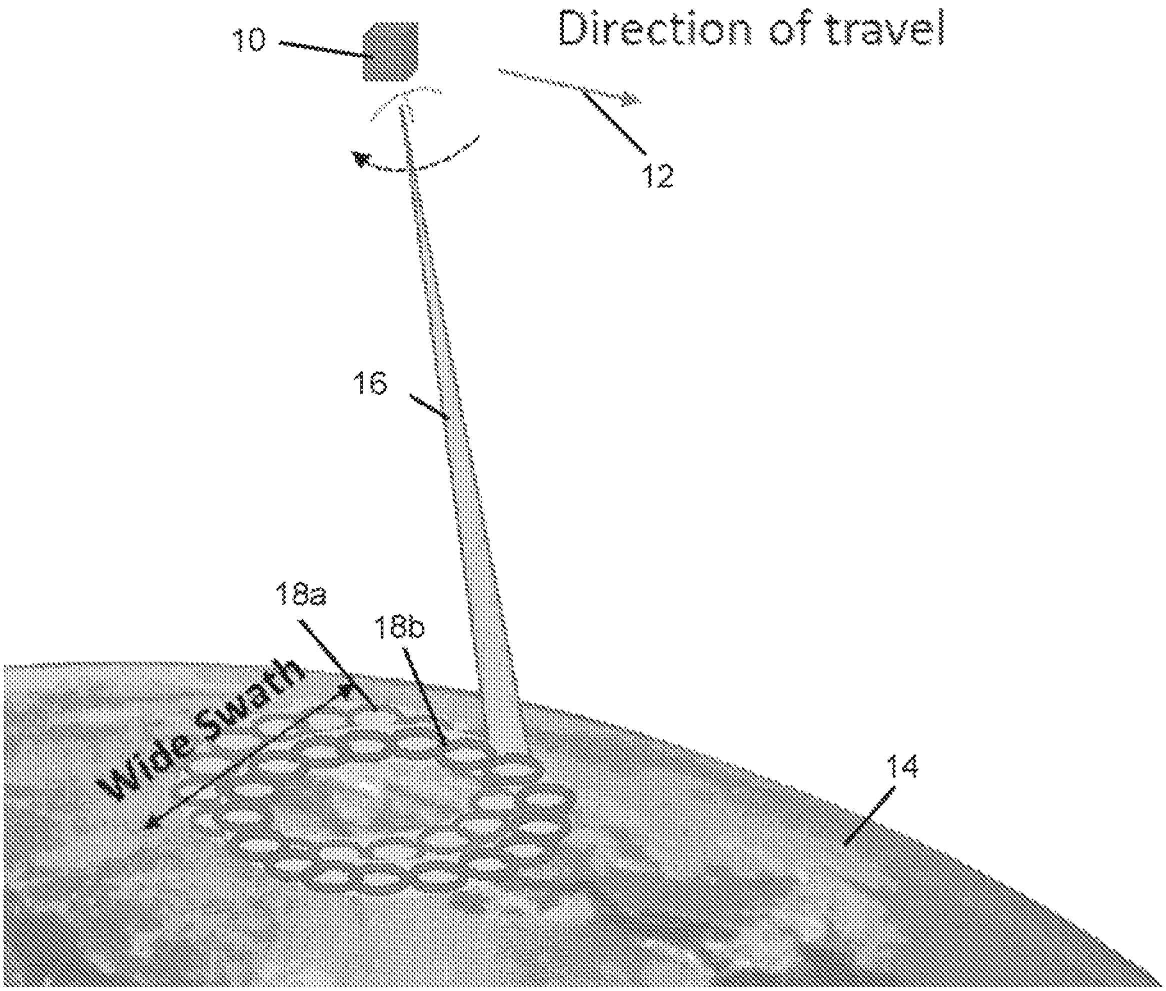
FIG. 3 is a schematic depiction of the operational concept of the present disclosure.

As depicted in FIG. 3, a general schematic of an exemplary system and method in accordance with the disclosure is provided. A radar scanning satellite 10, is deployed in orbit having a travel direction 12 about the Earth 14. A beam array 16 is electronically swept over a wide swath scan pattern 18*a*. The satellite 10 radar scan platform is then indexed forward one step in the direction of travel 12 and the scan is repeated where the beam array 16 is swept over a wide swath scan pattern 18*b* which is in an indexed overlapping relation to scan pattern 18*a*.

The electronic conical scanning, as shown in FIG. 3, can provide wide swath coverage with high spatial resolution and provides multiple azimuth look directions for each pixel in the scan. As with cross track scanning, it uses a pencil beam providing high gain and high spatial resolution and the ability to provide observations of both the atmosphere and the surface. However, a constant incidence angle for each antenna beam is maintained while the scan beam is rotated in azimuth. This simplifies the system calibration and interpretation of the surface parameters. Then, as can be seen in the illustration, the fore and aft portions of the scan provide two different azimuth look angles for each pixel being observed. Operating with a second beam (or more) additional azimuth angles are observed for each pixel. This provides the ability to observe and retrieve not only atmospheric parameters but surface parameters which require multiple azimuth looks to interpret the radar observation. This geometry allows for different paths through the same atmosphere to be observed providing additional information about the atmosphere. While conventional approaches scan one or more beam over 360 degrees in azimuth, when multiple incidence angles are used, the inner angles do not illuminate the outer portions of the swath. This results in a reduction in the number of looks and requires higher transmit power. Since the swath coverage and incidence angles are tied together, the choice of incidence angle cannot be optimized to the geophysical or other parameters being observed.

Figure 4:
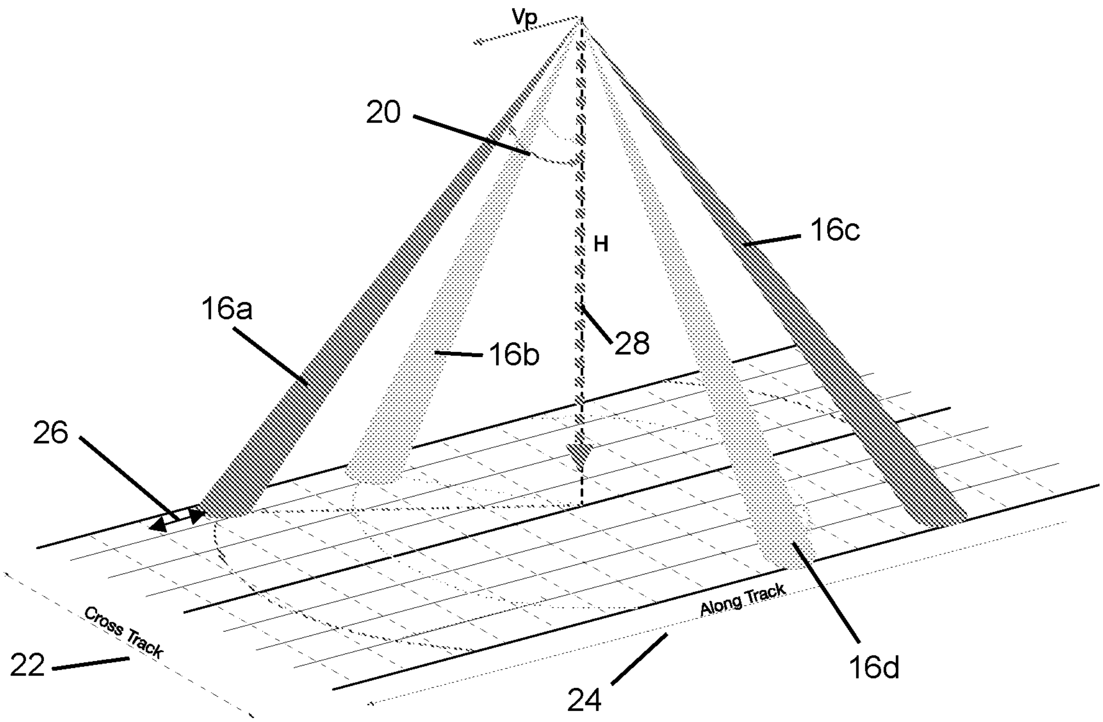
FIG. 4 is diagram depicting the radar scanning method and path of the present disclosure.

Turning now to FIG. 4, an exemplary scanning method of the present disclosure is depicted in greater detail. The disclosed measurement approach allows for a significantly lower size, weight and power (SWaP) spaceborne radar system that can provide wide swath, high-resolution observations of multiple parameters, weather and Earth processes from space and stratospheric platforms. This approach combines a multi-antenna beam electronic conical scan geometry with a multi-mode reconfigurable software defined radar (SDRr) system. In this example, four radar scan beams

16*a*, 16*b*, 16*c*, 16*d* are illuminated and the complex volume and/or surface backscatter signals of each of the beams 16*a*, 16*b*, 16*c*, 16*d* is recorded. Each beam is swept at an azimuth having a constant incidence angle 20 over the azimuth sector that covers the cross track 22 swath before the platform moves one along track 24 pixel 26 forward in order to provide continuous mapping of the volume and surface covered by the swath. For simplicity only the ground swath is shown. Complex volume backscatter from each beam 16*a*, 16*b*, 16*c*, 16*d* is recorded and mapped to each altitude layer along H to provide full mapping of the atmosphere. In employing this multi-beam electronic scanning process, each pixel is viewed by each beam thereby providing multiple scans of the same pixel, in the illustrated case this provides four looks at each pixel from two incidence angles and four azimuth angles.

In this example, the multi-beam conical scan depicts four beams shown at two different incidence angles. It should be appreciated that in the context of this disclosure, multi-beam conical scanning refers to any number of beams of two or greater and that each beam in the multi-beam array can be assigned different fixed incidence angles or may be grouped such that one or more of the beams in the array have the same incidence angle. Further, an additional nadir viewing beam 28 may be added to provide coincident nadir viewing measurements.

Figure 5:
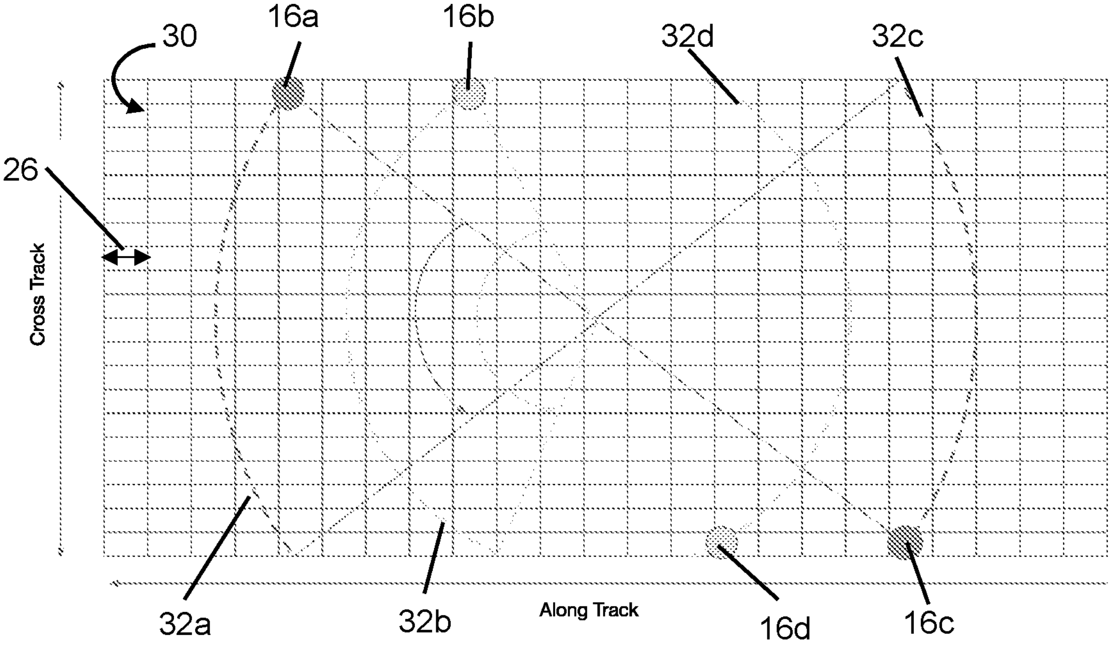
FIG. 5 is a top-down plan view depicting the radar scanning method and path of the present disclosure.

FIG. 5. Provides a top view of the multi-beam conical scan disclosed. This illustrates one of multiple altitude slices 30, wherein each altitude slice is sampled from a perpendicular plan to the z-axis along the height (depicted at H in FIG. 4). Again, four beams 16*a*, 16*b*, 16*c*, 16*d*, at two different incidence angles are swept through their azimuth sector to cover a swath. Individual footprints at an instant in time are shown by the shaded circles representing beams 16*a*, 16*b*, 16*c*, 16*d* and dashed line shows the path 32*a*, 32*b*, 32*c*, 32*d* along which the beams 16*a*, 16*b*, 16*c*, 16*d* are swept. Each sector scan completes prior to platform moving one along track pixel 26 forward.

Figure 6:
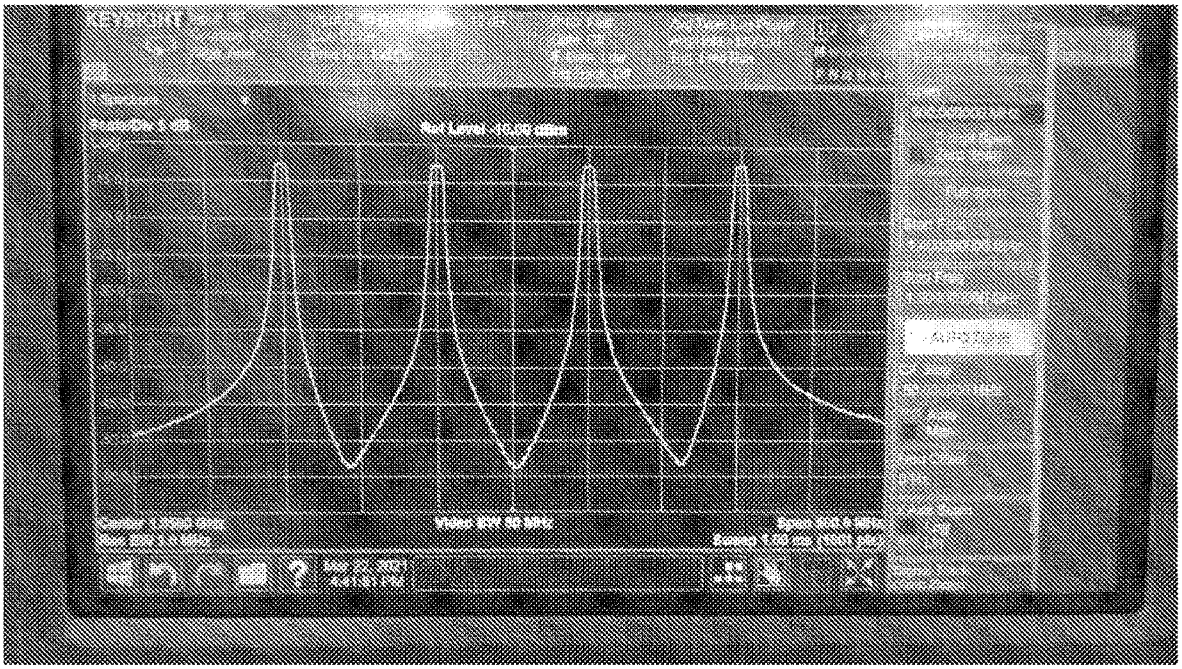
FIG. 6 is a depiction of the modulated pulse waveform generated using the scanning and transmit method of the present disclosure.

To further reduce the SWaP of the system, the present disclosure employs a unique simultaneous frequency diversity approach in the SDRr. In this arrangement a single SDRr transmit/receive channel is employed to support the signals from the multiple antennas corresponding to each of the beams 16*a*, 16*b*, 16*c*, 16*d* simultaneously. As depicted at FIG. 6 a frequency diversity transmit waveform is generated through a wide bandwidth DAC. In this example four linear frequency modulated pulse waveforms can be seen each separated by 100 MHz. Using a wide bandwidth arbitrary waveform generator (i.e. digital to analog converter, DAC), simultaneous waveforms are generated that are each separated from one another in frequency. In this manner the signal channel output is separated, in this case into four channels either in the IF or RF transmit section of the radar transmitter (depends on final transmit frequency and optimal radar frequency plan). After being separated, the signal from each of the beams 16*a*, 16*b*, 16*c*, 16*d* can be sent through the final transmit path to the antenna feed for its beam. On reception of the receive signals from each beams 16*a*, 16*b*, 16*c*, 16*d* antenna, the receive signals are amplified and combined either in the RF or IF section of the radar system and sent to a signal digital receiver channel (i.e., ADC). Using sub channels and digital bandpass filtering, the return signal from each beams 16*a*, 16*b*, 16*c*, 16*d* antenna can be separated and processed. This approach allows for a single ADC and DAC to be used thus reducing the SWaP of the SDRr and thereby also simplifies the calibration through using common waveform generation and processing hardware for all antenna beams.

The innovations proposed in the present disclosure overcomes the identified prior art limitations and provides a lower size, weight and power solution through unique sampling strategy that makes deployment on smaller satellite buses possible while achieving same or better measurement quality of today's larger systems.

Through electrical sector scanning, the swath coverage and operational incidence angles can be separated. FIG. 4 illustrates this approach. This allows the choice of incidence angle to exceed the swath coverage requirement which, in turn, allows optimization to the observations. When operating with more than one incidence angle, each beam observes every pixel in the swath so that power and resources are optimized and the number of looks on each pixel is maximized, which in many cases reduces the transmit power requirements. Further, the disclosed innovations simultaneously illuminate all beams in the radar array and through a frequency diverse waveform, that is directed based on frequency to the four beams shown in the example, the simultaneous return from each beam may be separated in the software defined radar digital receiver processor.

This sector methodology may also be utilized with a mechanical conical system to maximize dwell time on the swath. Previous mechanical systems scanned the full 360 degree path which meant at least one of the beams looks at areas outside of where the other beam looks.

In the illustrative embodiment shown in FIG. 4, four beams are illuminated, including two fore beams and two aft beams. Each beam is rotated over the azimuth sector required to cover the swath. By illuminating and receiving on all four beams, the number of observations per pixel is increased by the number of simultaneous beams (i.e., four in this case). This reduces the fading noise of the surface and atmospheric observations by square root of the number of looks, so in this case by a factor of 2. Through non coherent averaging of the returns, the signal to thermal noise is also improved by factor of 2 (i.e. 3 dB). If the overall power is kept constant, that is each beam transmits 1/N (N=4 in this case) the peak power compared to a conventional system that would have a single beam and all the transmit power directed to it, this reduces the signal to thermal noise by a factor of 4. However, in the conventional system to achieve the higher power, often the multiple gain stages are power combined. This introduces additional losses. In the case of power combining four modules, there can be 0.5 to 1 dB more loss introduced. Further, the receiver channel must have more isolation and the front end has to handle higher transmit power levels. This also introduces further losses in the front-end duplexer. In the case given here (four simultaneous beams), the reduction of losses in the front end can be on the order of another 1 dB. Combining the lower losses for the simultaneous transmit-receive approach and the non-coherent gain, the same or very similar signal to thermal noise performance can be achieved, and with the additional looks being averaged the fading noise is also reduced. The result is that the simultaneous transmit-receive approach can achieve overall better measurement performance and by reducing the transmit peak power, the size, weight and power of the system can be significantly reduced due to much higher efficiencies and less components needed.

In one exemplary embodiment, a reconfigurable digital subsystem solution based on an object-orientated and network-centric system architecture that is expandable at a modular level through intra-module communication and synchronization is employed to control the scanning system. Such a system is disclosed in detail in U.S. Pat. No. 10,908,255, issued Feb. 2, 2021 and incorporated herein by reference.

At a hardware level, each module consists of a conduction cooled chassis; a main processor board with one or two high fidelity mezzanine expansion buses; and a power/PCIe mezzanine expansion bus. Based on the system's needs, an ARENA system can be populated with a particular power/PCIe mezzanine card and mezzanine expansion card(s). Each module can run as a standalone unit or multiple modules can be combined and synchronized through sync ports to provide a solution for more complex problems. As such, the present modular solution can address an extremely broad range of applications and system requirements while requiring little to no customer custom development.

To enable seamless reconfiguration, at all levels, the platform utilizes an object-oriented system architecture. The processes performed by each module, whether they are at the hardware, firmware and/or software levels, are broken down into encapsulated actions. Thus, the inputs and outputs governing, and resulting from, each action can be captured within an object, and the action itself becomes a method of the object.

Network centric communication (i.e. messaging) between objects is then achieved through a common "packet" based messaging scheme known as the ARENA intra-object communications API. Each packet is self-descriptive providing the intended receiver(s) with information to be able to parse and interpret the data/information within the packet. In this paradigm, each object can report what it needs and what it provides to allow the system to self-build, and objects can be linked together through the intra-object communications API, allowing complex processes to be performed by a collection of ARENA encapsulated objects.

Each module includes a synchronization interface (Sync interface) that operates in conjunction with a system reference clock to control the pulse intervals of signal transmissions. Where multiple modules are present, one sync interface can be configured as a master which generates the sync signal while the other modules take on the role of slaves which receive the sync signal. The sync interfaces support both serial and parallel signal distribution.

A primary sequence controller (PSC) controls the run-time behavior and timing of the modules. In multi-module configurations, any module can be designated to execute the functions of the PSC, and the PSC communicates with all of the other modules through the Sync interface. In exemplary embodiments, a dedicated Control and Timing Unit (CTU) hosts the PSC. The PSC is governed by a PSC Table that defines the sequence of modes that should be executed and a period for each entry. The PSC table allows for internal repeat loops and it can be asynchronously interrupted with an interrupt sequence table and external trigger.

Each object within the system (both at the module and at the mezzanine level) has a Mode Configuration Table (MCT) object that defines for each Mode the configuration that should be used in the sequence. This allows each object to be reconfigured on a pulse-to-pulse basis.

Each software application is also modular and self-builds based on the system objects that are generated by the module and the run-time configuration objects.

One of the features of the present system is the Digital Receiver Firmware provided in each ADC based mezzanine card. The "default" digital receiver implementation in the system provides the ability for each profile to send out ADC samples, digital receiver I & Q profile gates, range gates after the forward FFT, range gates after the reverse FFT (i.e. match filter output) and range gates of the products (coherent averaging products and pulse pair products). The present system architecture allows the user, by mode and sub channel, to specify any of these outputs and multiple different outputs on each profile.

As a result, the disclosure of the example embodiments provides wide swath coverage and high spatial resolution through azimuth rotation at constant incidence scan angle which in turn allows high sensitivity pencil beam geometry. Further, the use of constant scan incidence simplifies calibration and geophysical retrievals that facilitates constant measurement error across the entire swath.

The use of a fixed beam allows optimization of the sidelobe (SL) pattern to suppress surface return in lower boundary scan layer, while dual beam sampling can eliminate SL contamination. Further this arrangement provides multiple looks (fore and aft) for improved measurement precision and retrievals.

While there is shown and described herein certain specific structure embodying the technology, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The invention claimed is:

1. A method comprising:

causing an electronically steerable radar array suspended above a surface at a high elevation to generate, on a common scan pass, at least a first pencil beam having a first direction and a second pencil beam having a second direction different from the first direction, including indexing each of the first and second pencil beams generated by said electronically steerable radar array to define points on a grid having a cross track perpendicular to a direction of travel of said radar array and an along track in line with said direction of travel of said radar array;

causing the electronically steerable radar array to independently direct the first pencil beam and the second pencil beam at respective fixed incidence angles along at least one scan path that sweeps across said cross track and illuminates the points on the grid; causing the electronically steerable radar array to receive first pencil beam return signals and second pencil beam return signals, the received first pencil beam return signals and second pencil beam return signals comprising combinations of atmospheric layer return signals and surface return signals; and causing processing of the received first pencil beam return signals and second pencil beam return signals to generate information based on combinations of atmospheric layer return signals and surface return signals.

2. The method of claim 1 further including at least one digital signal processor using the generated information to enable observation of at least one of an atmospheric layer and the surface.

3. The method of claim 1 wherein the return signals represent backscatter.

4. The method of claim 1 wherein the radar array is suspended on a satellite platform.

5. The method of claim 1 wherein the generated information indicates one or more weather conditions.

6. The method of claim 1 wherein the generated information is based on multiple samples on return signals separated from each of the first pencil beam and the second pencil beam.

7. The method of claim 1 further including mapping an aspect of the return signals to an atmospheric altitude layer.

8. The method of claim 7 further including using the return signals to provide a complete mapping of a scanned volume.

9. The method of claim 1 further causing the electronically steerable radar array to perform multiple scans of said first and second pencil beams on the same scan pass.

10. The method of claim 1 further including causing the electronically steerable radar array to perform multiple scans on multiple incidence and/or azimuth angles in different scan passes.

11. The method of claim 1 wherein receiving comprises receiving multiple parameters representing observed weather conditions.

12. The method of claim 1 wherein receiving comprises receiving multiple parameters representing observed surface processes.

13. The method of claim 1 further including causing the radar array to scan a plurality of altitude slices with each of the first pencil beam and the second pencil beam.

14. The method of claim 1 wherein the return signals provide samples of one or more selected altitude slices based at least in part on separation of returned backscatter signal(s) from each of the first pencil beam and the second pencil beam.

15. The method of claim 1 further comprising separating atmospheric layer return signals from surface return signals.

16. A method comprising:

causing an electronically steerable radar array suspended above a surface at a high elevation to generate, on a first scan pass, to direct a first pencil beam along a first, fixed incident angle along at least one scan path that sweeps across a cross track perpendicular to a direction of travel of said radar array and an along track in line with said direction of travel of said radar array, and illuminates points on a grid;

causing the electronically steerable radar array suspended above the surface at the high elevation to generate, on a second scan pass different from the first scan pass, to direct a second pencil beam at a second, fixed incident angle different from the first, fixed incident angle along the at least one scan path that sweeps across the cross track perpendicular to the direction of travel of said radar array and the along track in line with said direction of travel of said radar array, and illuminates additional points on the grid;

causing the electronically steerable radar array to receive first pencil beam return signals and second pencil beam return signals, the received first pencil beam return signals and second pencil beam return signals each comprising a combination of atmospheric layer return signals and surface return signals; and causing processing of the received first pencil beam return signals and second pencil beam return signals to generate information based on combinations of atmospheric layer return signals and surface return signals.

17. The method of claim 16 further including at least one digital signal processor using the generated information to enable observation of an atmospheric layer and/or the surface.

18. The method of claim 16 wherein the return signals represent backscatter.

19. The method of claim 16 wherein the radar array is suspended on a satellite platform.

20. The method of claim 16 wherein the generated information indicates one or more weather conditions.

21. The method of claim 16 wherein the generated information is based on multiple samples on return signals separated from each of the first pencil beam and the second pencil beam.

22. The method of claim 16 further including mapping an aspect of the return signals to an atmospheric altitude layer.

23. The method of claim 22 further including using the return signals to provide a complete mapping of a scanned volume.

24. The method of claim 16 further causing the electronically steerable radar array to perform multiple scans of each of said first and second pencil beams.

25. The method of claim 16 further including causing the electronically steerable radar array to perform multiple scans on multiple incidence and/or azimuth angles in different scan passes.

26. The method of claim 16 wherein receiving comprises receiving multiple parameters representing observed weather conditions.

27. The method of claim 16 wherein receiving comprises receiving multiple parameters representing observed surface processes.

28. The method of claim 16 further including causing the radar array to scan a plurality of altitude slices with each of the first pencil beam and the second pencil beam.

29. The method of claim 16 wherein the return signals provide samples of one or more selected altitude slices based at least in part on separation of returned backscatter signal(s) from each of the first pencil beam and the second pencil beam.

30. The method of claim 16 further comprising separating atmospheric layer return signals from surface return signals.

* * * * *